Aug. 26, 1969    M. J. BRIENZA    3,463,573
CONTINUOUSLY VARIABLE LASER ACOUSTIC DELAY LINE
Filed June 1, 1967

INVENTOR.
MICHAEL J. BRIENZA
BY
Donald F. Bradley
ATTORNEY

United States Patent Office 3,463,573
Patented Aug. 26, 1969

3,463,573
CONTINUOUSLY VARIABLE LASER ACOUSTIC DELAY LINE
Michael J. Brienza, Vernon, Conn., assignor to United Aircraft Corporation, East Hartford, Conn., a corporation of Delaware
Filed June 1, 1967, Ser. No. 642,829
Int. Cl. G02f 1/34
U.S. Cl. 350—161                    8 Claims

ABSTRACT OF THE DISCLOSURE

An optical beam such as from a laser is propagated through a transparent ultrasonic cell in which has been generated an ultrasonic-acoustic wave. The ultrasonic cell is provided with non-parallel end walls, and the acoustic wave echoes between the end walls, intersecting the optical beam at a different angle for each pass of the acoustic wave through the beam. By selectively rotating the ultrasonic cell, the intersection between the optical beam and the acoustic wave may be made to occur at the Bragg angle. When this occurs a portion of the optical beam is both diffracted from the cell and frequency shifted by an amount equal to the acoustic frequency. The time delay between initiation of the acoustic wave and its intersection with the optical beam may be continuously varied by translation of the ultrasonic cell or scanning of the optical beam to produce a variable time delay.

CROSS REFERENCE TO RELATED APPLICATIONS

The present invention is particularly well suited for use in existing laser-acoustic delay lines. See for example, copending application Ser. No. 364,395, entitled "Variable Laser-Ultrasonic Delay Line" filed May 4, 1964, by Anthony J. De Maria; copending application Ser. No. 551,965, entitled "Variable Acoustic Laser Delay Line," filed May 23, 1966, by Anthony J. De Maria; and copending application Ser. No. 552,077, entitled "Laser Delay Line Using a Biasing Signal" filed May 23, 1966, by Anthony J. De Maria, all of which applications are assigned to the same assignee as this invention.

BACKGROUND OF THE INVENTION

Field of the invention

This invention relates to delay lines for providing an adjustable delay to an electrical signal. More particularly, this invention relates to an ultrasonic-acoustic laser delay line in which an acoustic wave is generated in an ultrasonic cell by an electrical input signal. An optical beam such as a laser beam is propagated through the cell to intersect the acoustic wave, the laser beam being modulated by its interaction with the acoustic wave in a manner commensurate with the electrical input signal. The output from the laser is then reconverted into an electrical output signal identical to the electrical input signal, but delayed in time. By means of this invention the time delay between the initiation of the acoustic wave and its intersection with the optical beam may be continuously varied over a selected range.

Description of the prior art

Continuously variable delay lines utilizing laser acoustic interaction are well known in the art, as indicated in the copending applications referenced previously. The delay in the prior art devices is produced by physically translating the ultrasonic cell to thereby vary the time delay between the initiation of the acoustic wave in the cell, and its point of intersection with the laser beam. Another method for producing a variable delay is by optical beam scanning.

Prior art devices suffered from the fact that the total delay which could be produced was very small, not more than a few microseconds. In order to produce appreciable delays, the path length of the acoustic wave must be long. For example, to obtain a 20 microsecond delay, the path length of the acoustic wave in a solid cell must be approximately 10 centimeters. Such lengths for single crystal materials of high optical quality with high precision polished faces are extremely costly, and in many cases, particularly for some of the more useful materials, are presently impossible to produce.

Another disadvantage of the prior art devices is the fact that the output of the laser, whether produced by the primary laser beam or by a diffracted beam, contains several undesirable echo signals resulting from acoustic echoes in the cell. These echoes must be eliminated by properly terminating the end of the ultrasonic cell opposite the transducer.

To obtain significant delays in the prior art devices it is necessary to allow the acoustic wave to reflect internally so as to fold the acoustic path, and then selectively remove the undesired echoes, a complicated, expensive and undesirable procedure.

SUMMARY OF THE INVENTION

An object of the present invention is to provide an improved continuously variable laser-acoustic delay line in which the delay may be varied over a wide range.

Another object of the present invention is to provide an improved laser acoustic delay line in which very large delays may be obtained.

In accordance with the present invention, the ultrasonic cell is provided with non-parallel end walls, and the acoustic wave is allowed to reflect back and forth in the ultrasonic cell, the path of which defines the plane containing the optical beam. When the laser beam is propagated through the cell, the acoustic wave intercepts the laser beam at a different angle for each pass of the acoustic wave through the cell. The angle of intersection is adjusted by physically rotating the ultrasonic cell so that the angle between the laser beam and the acoustic wave at the desired point of intersection occurs at the Bragg angle. This point of intersection may be varied continuously over the total path length of the acoustic wave. When the intersection takes place at the Bragg angle, a single diffracted order is produced, the diffracted order being frequency shifted by the Doppler effect in an amount commensurate with the acoustic wave frequency. This frequency shifted diffracted order may then be heterodyned with the undiffracted laser output to produce a signal identical with the input signal but delayed in time.

Since the acoustic wave is reflected back and forth in the ultrasonic cell, the acoustic wave will intersect the optical beam at numerous other points in the ultrasonic cell, but no diffraction or scattering of the laser beam will occur at these other points of intersection because the points the points of intersection do not occur at the Bragg angle.

Thus in accordance with this invention a much longer path length is available for the acoustic wave thereby resulting in time delays which are considerably longer than those obtainable in the prior art. In addition, by adjusting the angle of intersection of the laser beam with a selected reflected pass of the acoustic wave, the point at which the intersection takes place at the Bragg angle may be continuously varied to thereby provide any desired time delay within the range available.

DESCRIPTION OF THE PREFERRED EMBODIMENT

For frequencies above a few hundred megacycles in solid materials an optical beam is scattered or diffracted appreciably by an acoustic wave only if the angle between the optical beam and the acoustic wave is at the Bragg angle, that is, when the angle $\theta$ between the optical beam and the normal to the acoustic wave is specified by $\sin \theta_B = \lambda_0/2\Lambda n$, where $\lambda_0$ is the free space wavelength of the optical beam, $\Lambda$ is the acoustic wavelength, and $n$ is the index of refraction of the ultrasonic cell. The Bragg angle at about 500 megacycles for typical materials is on the order of one-half to one-third degree.

For abnormal or Bragg type diffraction only one diffracted order is produced, and the diffracted beam varies in intensity $I$, with angular deviations $\Delta\theta$ from the Bragg angle $\theta_B$ as $$I = I_o \left[ \frac{\sin \frac{\pi L \Delta \theta}{\Lambda}}{\frac{\pi L}{\Lambda}} \right]^2$$

where $L$ is the length of the acoustic field through which the optical beam passes, and $I_o$ equals $I(\Delta\theta = 0)$. For a frequency of 500 megacycles and an acoustic field length of 0.1 inch in quartz, the intensity $I$ is at a maximum at an angle of 0° 40 minutes, and falls to zero at 0° 20 minutes and 1° 0 minutes, with the distance between the half power points being approximately 30 minutes of arc ($\Delta\theta$ half).

If the angle between the optical beam and the acoustic wave is not at the Bragg angle, little or no scattering or diffraction takes place.

Figure 1:
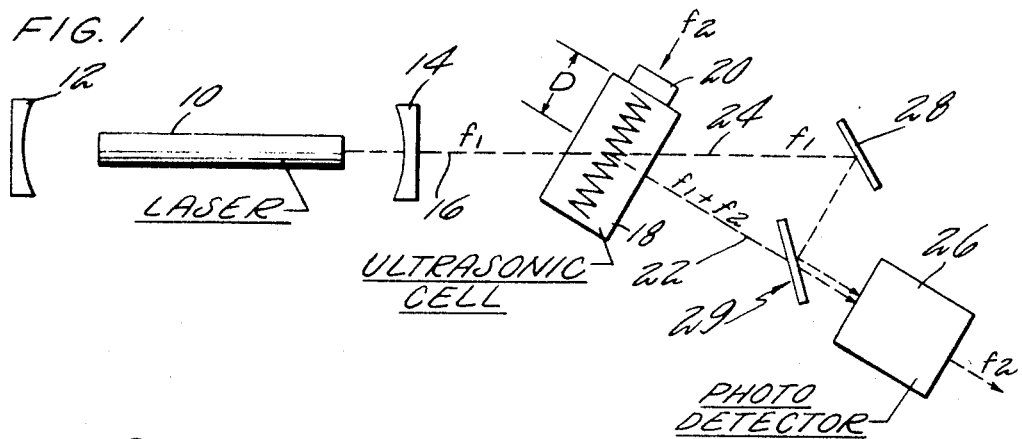
FIGURE 1 is a schematic representation of the continuously variable laser-acoustic delay line of the prior art.

FIGURE 1 shows a typical prior art continuously variable laser acoustic delay line. A laser 10 such as Argon ion or other well-known type of laser device is inserted into an optical feedback cavity comprising end reflectors 12 and 14. By means of proper pumping apparatus, not shown, the laser will produce an output beam having a frequency $f_1$ depending on the type of laser.

An ultrasonic cell 18 such as a quartz crystal or liquid cell is positioned so that the laser output beam 16 intersects the ultrasonic cell. Although not shown, the ultrasonic cell may be positioned within the laser feedback cavity. A transducer 20 is bonded or otherwise connected to one end of ultrasonic cell 18. Such transducers and bonding methods are well known in the art.

Transducer 20 is actuated by an electrical signal, not shown, having a frequency $f_2$. The action of the transducer institutes an ultrasonic-acoustic wave within the ultrasonic cell 18. If the frequency of the ultrasonic-acoustic wave is in the range of where Bragg diffraction takes place, 200 megacycles or above depending upon the material, and the acoustic wave intersects the laser beam at the Bragg angle, a diffracted beam 22 is produced, the diffracted beam being shifted in frequency by an amount equal to the frequency of the electrical input to the transducer. An undiffracted output 24 is also produced.

The original electrical signal having a frequency $f_2$ may be recovered by beating or heterodyning the two outputs 22 and 24 by means which are well known. For example, a photodetector 26 is shown positioned to receive diffracted beam 22, and undiffracted beam 24 is also reflected to the input of photodetector 26 by means of a mirror 28 and beam splitter 29. As a result of the beating which takes place between the two inputs, an electrical output signal having a frequency $f_2$ is produced by the photodetector.

The delay of the electrical signal is determined by the total acoustic distance D between the end of the ultrasonic cell where the acoustic wave was initiated and the intersection of the acoustic wave with the laser beam at the Bragg angle. The delay may be increased or decreased by translating the ultrasonic cell and varying the point of intersection. The delay is a direct function of the time it takes the acoustic wave to be propagated through the ultrasonic cell to the point where it intersects the laser beam at the Bragg angle.

If the ultrasonic cell 18 in FIGURE 1 with parallel end walls is not properly terminated, the acoustic wave will be reflected within the cell and will produce undesirable echoes in the output signal because each intersection of the acoustic wave with the laser beam will be at the Bragg angle, and thereby produce a diffracted order.

Figure 2:
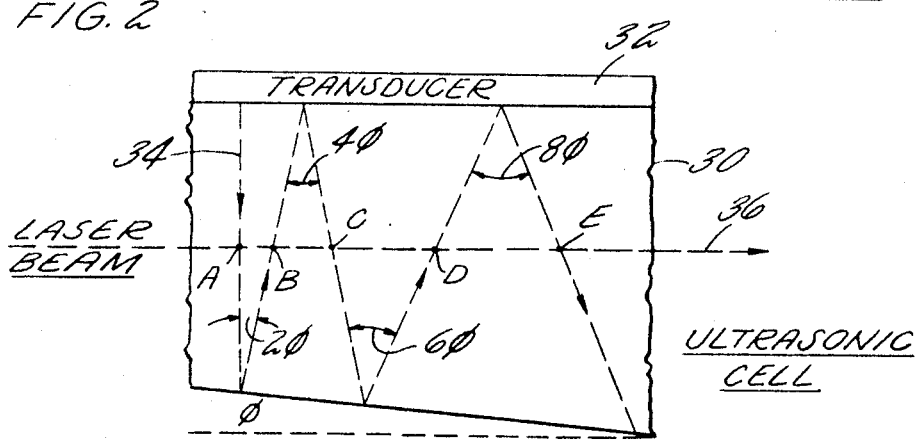
FIGURE 2 is a schematic illustration of the action of the acoustic wave in the ultrasonic cell.

FIGURE 2 shows a portion of an ultrasonic cell 30 of this invention with its associated transducer 32 in which the bottom face of the ultrasonic cell is non-parallel with the top face adjacent the transducer. The bottom face deviates from parallel by an angle $\phi$.

If transducer 32 is actuated to produce an acoustic wave, the wave, the direction of which is shown at 34, will reflect back and forth within ultrasonic cell 30 with each pass occurring at different angles with respect to a laser beam 36 propagating through the cell. With this arrangement it is possible to rotate and translate the entire ultrasonic cell 30 to thereby cause the point of intersection of the laser beam and the acoustic wave to occur at the Bragg angle at any point in the cell, and thereby choose the delay between the initiation of the acoustic wave and its intersection with the laser beam. For example, if a delay of 25 microseconds is desired, and the time for the acoustic wave to propagate from one end of the transducer to the other is 10 microseconds, the intersection of the acoustic wave and the laser beam at point C will poduce the desired delay. The interaction between the acoustic wave and the laser beam at point A, B, D and E will not produce a diffracted order because they do not take place at the Bragg angle. In addition, no termination of the end of the ultrasonic cell is required to eliminate echoes because no other output signal is produced.

Figure 3:
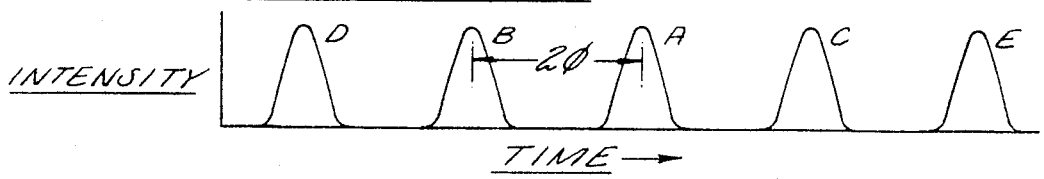
FIGURE 3 is a graphical illustration of the intensity of the delayed output signal as the acoustic cell is rotated and translated.
Figure 3:
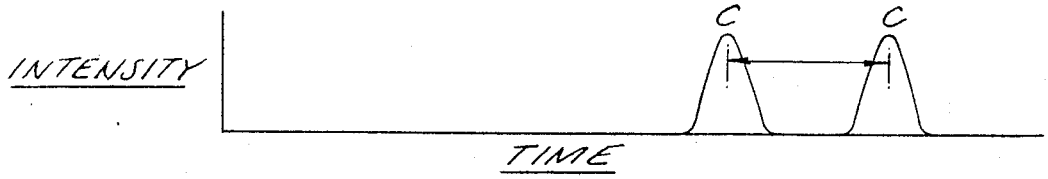

FIGURE 3 shows graphically the time delay which may be produced by this invention. The top portion of the graph shows the effect of clockwise rotation, while the bottom portion shows the effect of translation of the ultrasonic cell at a fixed angle of rotation.

In the case of rotation of the ultrasonic cell, an output A as shown in FIGURE 3 will be produced if the cell is rotated such that the intersection between the laser beam and the acoustic wave occurs at the Bragg angle at point A in FIGURE 2. If the ultrasonic cell 30 is rotated slightly in a clockwise fashion to produce the intersection at the Bragg angle at point C, pulse C of FIGURE 3 appears with the approximate time delay shown.

The amount of clockwise rotation necessary to go from satisfaction of the Bragg angle at position A to position C, and therefore to move the output signal from A to C shown in FIGURE 3 is $2\phi$. Likewise further counterclockwise rotation of an additional $2\phi$ produces the output commensurate with the satisfaction of the Bragg angle at E. Similarly $2\phi$ counterclockwise rotations from the position for A will yield the output signals commensurate with Bragg angle satisfaction at positions B and D. It should be noted that the satisfaction of the Bragg angle for an individual transit of the acoustic wave is uniquely related to an angular position of the ultrasonic cell and no other signal will appear since only that one selected transit satisfies the Bragg condition and is therefore capable of diffracting any light.

It is clear from FIGURE 2 and the foregoing discussion that each pass of the acoustic wave is separated from the previous pass by an angle equal to $2\phi$. Thus if the angle $2\phi$ is selected to be approximately $\Delta\theta$ half, that is approximately the distance of the half power points along the intensity curve of the diffracted order, no appreciable overlap in two adjacent passes will occur. For the example given herein, where $\Delta\phi$ half equals 30 minutes of arm, $\phi \cong 15$ minutes of arc, and is sufficient to completely sort out the various passes. In other words, one and only one diffracted order will appear in the output regardless of the number of points of intersection between the laser beam and the acoustic wave.

The lower portion of FIGURE 3 shows the continuously variable feature of this invention. If it is desired that the Bragg angle intersection between the laser beam and the acoustic wave take place in the third pass, the ultrasonic cell 30 may be translated to produce a variation in the time delay of a small amount, that is, the point of intersection, point A, may be varied to occur anywhere along the third pass of the acoustic wave.

A significant advantage of this invention is that reasonable delays may be obtained in short ultrasonic cells such as single crystals. In addition, the crystals need not be very wide or broad. This result follows from the fact that the "walk" distance of the acoustic wave is very short. For an angle $\phi$ equal to 15 minutes in a 2.54 centimeter crystal, the walk distance between point A and point E of FIGURE 2, i.e., between acoustic passes 1 and 5 through the optical beam would be about 1 millimeter. This is in contrast to folded path variable delay lines suggested by the prior art where the laser beam was perpendicular to the plane containing the acoustic beams. In the present case the laser beam is in the same plane with the folded acoustic path of the acoustic wave.

A significant advantage of this invention over the prior art where the acoustic beam is folded in a plane perpendicular to the laser beam and selection of an acoustic path is made by spatially placing the laser beam is that there is no region of signal overlap since even though the acoustic signals are present at the same time and place (e.g. near an end wall at the ultrasonic cell where the acoustic wave is reflecting) only the pass satisfying the Bragg angle produces the desired signal. In the prior art device this overlap region would be relatively useless. This region could be quite large depending on the acoustic signal length.

Mechanical tolerances required to move the ultrasonic cell to obtain a continuously variable delay are not significant. In addition, very short lengths of mechanical linear motion are required. The only requirement of the ultrasonic cell is that it be optically transparent. An acoustic crystal such as single crystal quartz or sapphire is satisfactory. Useful crystals are lithium niobate or lithium tantalate which do not require a separate transducer, and act as their own transducer by means of a metal probe on the surface.

Although the invention has been described with respect to a laser, it should be understod that a laser is not essential. However, the laser is by far the most convenient source of optical waves, and the lower intensity of optical sources other than lasers may produce a problem.

For miniaturized laser acoustic delay lines, a gallium arsenide injection laser is preferred.

Although the invention has been shown and described with respect to the preferred embodiment thereof, it should be understood by those skilled in the art that the foregoing and various other changes and omissions in the form and detail thereof may be made without departing from the spirit and scope of the invention, which is to be limited and defined only as set forth in the following claims.

Having thus described a preferred embodiment of my invention, what I claim as new and desire to secure by Letters Patent of the United States is:

1. In a continuously variable delay line including
means to generate a beam of coherent light,
an ultrasonic cell transparent to said light beam,
means to generate an acoustic wave in said cell,
and means to direct said light beam through said cell to intersect said acoustic wave,
the improvement which comprises
means for reflecting said acoustic wave back and forth within said cell to intersect said light beam at a different angle for each pass of said acoustic wave through said light beam, at least one of said intersections being at the Bragg angle.

2. A continuously variable delay line as in claim 1 in which said means for reflecting said acoustic wave includes means for providing said ultrasonic cell with non-parallel end walls.

3. A continuously variable delay line as in claim 2 in which said optical beam is diffracted when the angle of intersection between said optical beam and said acoustic wave is at the Bragg angle,
and including means for rotating said ultrasonic cell to produce Bragg angle intersection between said acoustic wave and said optical beam at any selected reflection of said optical beam.

4. A continuously variable delay line as in claim 3 and including means for translating said ultrasonic cell to thereby vary the time delay between generation of said acoustic wave and its intersection with said optical beam.

5. A continuously variable delay line as in claim 1 in which said means to generate a beam of coherent light is a laser.

6. A continuously variable delay line in claim 1 in which said ultrasonic cell is an acoustic crystal.

7. A continuously variable delay line as in claim 6 in which said ultrasonic cell is a piezoelectric crystal.

8. In a continuously variable delay line including
means to generate a beam of coherent light,
an ultrasonic cell transparent to said light beam,
means to generate an acoustic wave in said cell,
and means to direct said light beam through said cell to intersect said acoustic wave at the Bragg angle and produce a diffracted order output,
the improvement which comprises the steps of
reflecting said acoustic wave back and forth between the end walls of said ultrasonic cell to intersect said optical beam at a different angle for each pass of said acoustic wave through said optical beam,
and rotating and translating said ultrasonic cell to select the time delay between generation of said acoustic wave and its intersection with said optical beam at the Bragg angle.

References Cited

UNITED STATES PATENTS 3,419,322   12/1968   Adler _____ 350—161

ALFRED L. BRODY, Primary Examiner

DARWIN R. HOSTETTER, Assistant Examiner

U.S. Cl. X.R.

307—88.3; 333—30